(12) United States Patent
Hon et al.

(10) Patent No.: US 9,729,039 B2
(45) Date of Patent: Aug. 8, 2017

(54) LINEAR DRIVE UNIT WITH A MAGNETIC GAP CHANGING MECHANISM

(71) Applicant: FANUC CORPORATION, Minamitsuru-gun, Yamanashi (JP)

(72) Inventors: Yonpyo Hon, Yamanashi (JP); Kenzo Ebihara, Yamashi (JP)

(73) Assignee: Fanuc Corporation, Yamanashi (JP)

( * ) Notice: Subject to any disclaimer, the term of this patent is extended or adjusted under 35 U.S.C. 154(b) by 24 days.

(21) Appl. No.: 14/568,918

(22) Filed: Dec. 12, 2014

(65) Prior Publication Data
US 2015/0171722 A1 Jun. 18, 2015

(30) Foreign Application Priority Data
Dec. 17, 2013 (JP) .................. 2013-260434

(51) Int. Cl.
*H02K 41/06* (2006.01)
*H02K 41/02* (2006.01)
*B23Q 5/28* (2006.01)
*H02K 41/03* (2006.01)
(Continued)

(52) U.S. Cl.
CPC ......... *H02K 41/031* (2013.01); *H02K 21/025* (2013.01); *H02K 41/02* (2013.01); *H02K 41/033* (2013.01); *H02K 41/0356* (2013.01); *H02K 41/06* (2013.01); *B23Q 5/28* (2013.01); *H02K 2201/03* (2013.01); *H02K 2213/09* (2013.01)

(58) Field of Classification Search
CPC .. H02K 2201/03; H02K 41/02; H02K 41/031; H02K 41/033; H02K 41/0356; H02K 41/03; H02K 2213/09; H02K 21/025; B23Q 5/28

USPC ......... 310/12.01, 12.04, 12.05, 12.06, 12.07, 310/12.12, 12.15, 12.18, 12.25
See application file for complete search history.

(56) References Cited

U.S. PATENT DOCUMENTS

2003/0234584 A1* 12/2003 Miyata .................. H02K 41/031
310/12.01
2004/0012305 A1* 1/2004 Heilig .................... H02N 2/028
310/323.17
(Continued)

FOREIGN PATENT DOCUMENTS

| CN | 102437707 | 5/2012 |
| DE | 102006034123 | 1/2008 |
| JP | S60113651 | 6/1985 |

(Continued)

OTHER PUBLICATIONS

Mizuno Tsutomu, Alternating Current Linear Servomotor, Jul. 22, 1991, Amada Co Ltd, JP 03-169253.*
(Continued)

*Primary Examiner* — Burton Mullins
*Assistant Examiner* — Alexander Singh
(74) *Attorney, Agent, or Firm* — RatnerPrestia

(57) ABSTRACT

A linear drive unit and a machine tool having the linear drive unit, capable of being applied to various applications, while taking into consideration the balance between the thrust force and the cogging of a linear motor. The linear drive unit has a magnetic gap changing mechanism which is configured to change a magnitude of a magnetic gap between a coil and a magnet, by displacing at least one of the coil and the magnet so that the coil and the magnet approach or are separated from each other.

6 Claims, 3 Drawing Sheets

(51) Int. Cl.
*H02K 41/035* (2006.01)
*H02K 21/02* (2006.01)

(56) References Cited

U.S. PATENT DOCUMENTS

2008/0175684 A1   7/2008  Schmidt
2011/0100252 A1*  5/2011  Fukukawa .............. B60L 13/03
                                                                           104/293

FOREIGN PATENT DOCUMENTS

| JP | 61004460 | | | 1/1986 |
|----|----------|---|---|--------|
| JP | 03169253 | | | 7/1991 |
| JP | 03169253 | A | * | 7/1991 |
| JP | 2002034231 | | | 1/2002 |
| JP | 2003-250258 | A | | 9/2003 |
| JP | 2008118778 | | | 5/2008 |
| JP | 2010162659 | | | 7/2010 |

OTHER PUBLICATIONS

Japanese Office Action mailed Feb. 10, 2015 for Japanese Application No. 2013-260434.

* cited by examiner

PRIOR ART

LINEAR DRIVE UNIT WITH A MAGNETIC GAP CHANGING MECHANISM

BACKGROUND OF THE INVENTION

1. Field of the Invention

The present invention relates to a linear drive unit having a linear motor provided with a coil and a magnet, and relates to a machine tool having the linear drive unit.

2. Description of the Related Art

FIG. 5 schematically shows a structural example of a conventional linear motor. A linear motor 100 has a stator 106 formed by locating magnets 102 on an magnet core 104, and a moving element (or a coil) 112 formed by winding a three-phase winding wire 110 on a coil core 108, wherein a thrust force in a direction indicated by an arrow 114 is generated by current passing through winding wire 110. In general, the coil side is configured as a movable part, and the magnet side is configured as a fixed part. Magnets are aligned in the thrust force direction so that N-poles and S-poles are alternately positioned, over a length which is a summation of the length of the coil in the thrust force direction and a movable range (or a stroke length) of the coil.

FIG. 6 shows a schematic configuration of a linear drive unit 120 of the prior art, on which the conventional linear motor as shown in FIG. 5 is mounted, viewed in the thrust force direction of the linear motor. Coil 112 is fixed to a slide (or a movable part) 122, and stator 106 is fixed to a base (or a fixed part) 124. Slide 122 is supported by base 124 via a bearing 126 so that the slide is movable in the thrust force direction only. Therefore, in linear drive unit 120, a distance (or a magnetic gap "g") between coil 112 and stator 106 (magnet 102) is previously determined as a constant value.

The magnetic gap is an important factor which affects the performance of the linear motor. When the magnitude of the magnetic gap is changed, the performance (or the thrust force) of the linear motor is largely varied. As the related art document, JP 2003-250258 A discloses a linear motor wherein a moving element 12 is configured to slide relative to a movable part (or a table 2) in the vertical direction.

In the conventional linear motor as shown FIG. 5, it is noted that the thrust force is largely varied due to a change in the distance (magnetic gap "g") between coil 112 and magnet 102, even when the magnitude of current in coil 112 is not changed. Further, in the linear motor having coil core 108 as shown in FIG. 5, a magnetic flux density of magnet 102 is different by location, and thus a magnetic attractive force generated between coil 108 and magnet 102 when driving the motor is varied (i.e., cogging occurs). As magnetic gap "g" is reduced, the thrust force is increased and cogging is also increased. On the other hand, as magnetic gap "g" is increased, the thrust force is lowered and cogging is also lowered.

In a linear motor used for an ultra-precision processing machine, etc., in which a high feeding accuracy is required, in order to avoid deterioration in straightness of a feed axis due to cogging, the magnetic gap is set to a relatively large value so as to lower the thrust force. Otherwise, by using a coil having no core (i.e., a coreless coil), cogging cannot be generated in principle.

However, when the magnetic gap is increased or when the coreless coil is used, the cogging is limited whereas the thrust force of the linear motor is lowered. Therefore, in order to obtain large thrust force, it is necessary to apply large current to the coil. In this case, due to generated heat of the coil, machine accuracy of the linear motor or the machine tool having the linear motor may be deteriorated. In general, since a heat capacity of the machine tool is relatively high, it takes time for the temperature of the machine tool to return to normal after the temperature is changed (increased). Further, as one measure for avoiding the above problem, a cooling mechanism may be incorporated in the machine tool. However, since it is impossible for the position of the cooling mechanism to completely coincide with the position of the heat source, temperature distribution is inevitably generated in the machine tool.

In the invention of JP 2003-250258 A, moving element 12 is configured to slide relative to table 2. This is intended that thickness D of stator 11 and thickness R of moving element 12 are negligible when adjusting the distance (or the air gap) between stator 11 and moving element 12, the influence of relatively heavy table 2, and the positional relationship between table 2 and machine base 1 in the vertical direction even when moving element 12 is vibrated during use. In other words, in JP 2003-250258 A, the magnitude of the air gap is determined by second rail 7 and second slide 9, and it is not suggested that the magnitude of the air gap is purposely changed.

SUMMARY OF THE INVENTION

Thus, the object of the present invention is to provide a linear drive unit and a machine tool having the linear drive unit, capable of being applied to various applications, while taking into consideration the balance between the thrust force and the cogging of a linear motor.

One aspect of the present invention provides a linear drive unit having a linear motor provided with a magnet and a coil having a coil core, wherein a movable part is configured to linearly move relative to a fixed part via a bearing, wherein the linear drive unit comprises a magnetic gap changing mechanism which is configured to change a magnitude of a magnetic gap between the coil and the magnet, by displacing at least one of the coil and the magnet so that the coil and the magnet approach or are separated from each other.

In a preferred embodiment, the magnetic gap changing mechanism is an actuator which is driven electrically, pneumatically or hydraulically.

In a preferred embodiment, the magnetic gap changing mechanism is configured to position and hold the coil relative to the magnet between a first position where the magnetic gap is a first value and a second position where the magnetic gap is a second value larger than the first value.

In a preferred embodiment, a pair of linear motors are arranged opposed to each other in a direction of the magnetic gap, and magnitudes of magnetic gaps of the pair of linear motors are equal to each other.

When the magnetic gap changing mechanism is an actuator which is driven electrically, pneumatically or hydraulically, it is preferable that the coils, the magnets and the actuators in the pair of linear motors have symmetric structures, respectively, and the actuators are configured to simultaneously change the magnitudes of the magnetic gaps by the same amount of displacement.

In a preferred embodiment, the bearing is a hydrostatic air bearing.

Another aspect of the present invention provides a machine tool comprising at least one linear drive unit as set forth in claim 1, wherein the machine tool has a plurality of processing modes wherein the magnitudes of the magnetic gaps are different from each other.

BRIEF DESCRIPTION OF THE DRAWINGS

The above and other objects, features and advantages of the present invention will be made more apparent by the following description of the preferred embodiments thereof, with reference to the accompanying drawings, wherein.

DETAILED DESCRIPTION

Figure 1:
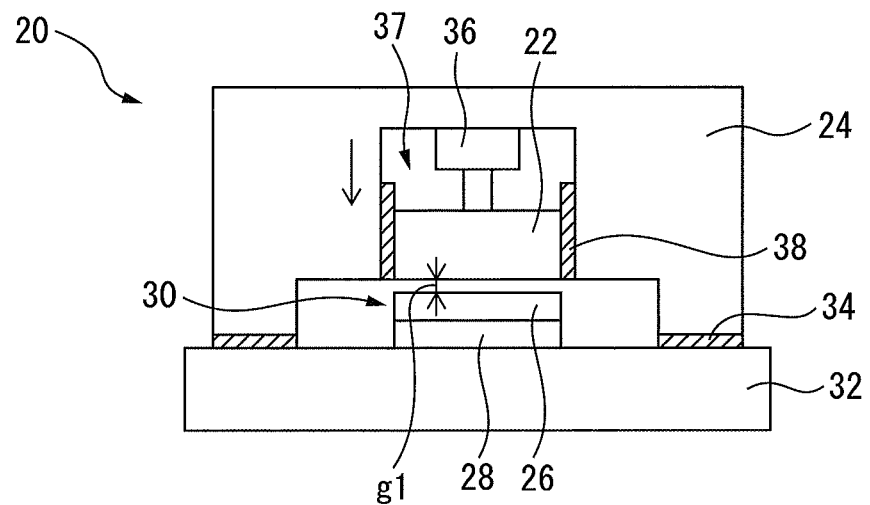
FIG. 1 is a view of a schematic configuration of a linear drive unit having a linear motor according to a first embodiment of the present invention, viewed in a traveling direction of the linear motor.

FIG. 1 is a view of a schematic configuration of a linear drive unit 20 having a linear motor according to a second embodiment of the present invention, viewed in a traveling direction of the linear motor. Linear drive unit 20 has a slide (or a movable part) 24 to which a coil 20, formed by winding a three-phase (U-, V- and W-phase) winding wire on a coil core, is fixed; and a base (or a fixed part) 32 to which a stator 30, formed by arranging a magnet 26 on a magnet core 28, is fixed. Coil 22 and stator 30 constitute a major part of the linear motor. Slide 24 is supported by base 32 via a slide bearing 34, so that slide 24 is movable only in the direction of thrust force of the linear motor. As slide bearing 34, a ball bearing, a hydrostatic oil bearing or a hydrostatic air bearing may be used. In this regard, the hydrostatic air bearing is most preferable, as described below.

The configurations of coil (or the moving element) 22 and stator 30 may be the same as the conventional coil and stator, respectively, and thus a detailed explanation thereof will be omitted. Actually, in order to drive the linear motor, a servo amplifier, an NC device and a linear scale are used, which are not illustrated.

Figure 2:
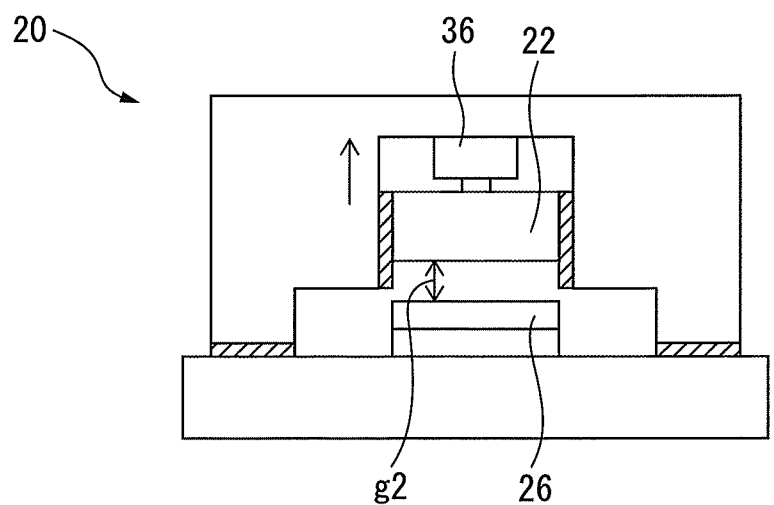
FIG. 2 is a view showing a state wherein the magnitude of a magnetic gap is changed in the linear drive unit of FIG. 1.

As shown in FIGS. 1 and 2, linear drive unit 20 has a magnetic gap changing mechanism (in the illustrated embodiment, an air cylinder) 36 configured to change the magnitude of an air gap between coil 22 and magnet 26 (for example, from gap g1 in FIG. 1 to gap g2 in FIG. 2, or vice versa) by moving at least one of coil 22 and magnet 26 (in the illustrated embodiment, coil 22) so that coil 22 and magnet 26 approach or are separated from each other. Air cylinder 36 has one (upper) end fixed to slide 24 (in the illustrated embodiment, an upper surface of a concave portion 37 formed in slide 24), and the other (lower) end fixed to coil 22. Due to a drive force of air cylinder 36, the position of coil 22 relative to slide 24 can be varied in the gap direction (in the illustrated embodiment, in the vertical direction).

Between (the inner surface of concave portion 37 of) slide 24 and coil 22, it is preferable that a coil bearing 38 such as a slide bearing be arranged, so that the movement direction of the coil is limited to the gap direction. However, when air cylinder 36 includes a bearing having sufficient stiffness, air cylinder 36 only may support coil 22 without using coil bearing 38. Otherwise, the coil may be supported by a plurality of air cylinders. Normally, since a magnetic attractive force of magnet 26 applied to coil 22 may become hundreds of N (Newtons), it is preferable that air cylinder 36 be configured to generate the drive force greater than the magnetic attractive force, in order to change and maintain the magnitude of the magnetic gap. Further, since controllability of the linear motor is deteriorated even when coil 22 is slightly moved during driving the linear motor, it is preferable that air cylinder 36 and coil bearing 38 have sufficient stiffness so as to maintain the position of coil 22.

FIG. 1 shows the state wherein air cylinder 36 is extended, i.e., coil 22 is positioned at a first position and the magnitude of magnetic gap g1 is relatively small. On the other hand, FIG. 2 shows the state wherein air cylinder 36 is contracted, i.e., coil 22 is positioned at a second position and the magnitude of magnetic gap g2 is larger than the magnitude of gap g1. As the magnitude of the magnetic gap increases, the density of magnetic flux is lowered due to increase in the distance between coil 22 and magnet 26, whereby the generated thrust force of the linear motor becomes small even when the same current passes through coil 22. Further, the magnetic attractive force applied to the core of coil 22 is lowered due to decrease in the density of magnetic flux. When the magnetic attractive force is lowered, the fluctuation (cogging) of the magnetic attractive force due to the position of slide 24 is also lowered proportional to the decrease in the magnetic attractive force. When the cogging is lowered, the straightness when the slide is moved in the direction of the thrust force is improved.

Accordingly, in the state of FIG. 2, the thrust force of the linear motor is lowered due to relatively large magnetic gap g2, while the straightness of slide 24 is improved. Therefore, the large magnetic gap is appropriate when linear drive unit 20 is used for an ultra-precision processing such as a finish machining, which requires accurate positioning with low load. On the other hand, as shown in FIG. 1, when the magnitude of magnetic gap g1 is relatively small, the thrust force of the linear motor is increased, while the straightness of slide 24 is deteriorated. Therefore, the small magnetic gap is appropriate when linear drive unit 20 is used for a processing which does not require accurate positioning but with high load. In addition, a practical magnetic gap is within a range of 0.5 mm to 5 mm. For example, when g1 is equal to 0.5 mm and g2 is equal to 5 mm, the thrust force or the cogging is different about five times between the cases of g1 and g2.

In the first embodiment, the air cylinder is explained as the magnetic gap changing mechanism for changing the magnitude of the magnetic gap. However, the magnetic gap changing mechanism is not limited to the actuator such as the air cylinder using pneumatic pressure. For example, an actuator that uses electricity such as a bidirectional solenoid or a piezoelectric element, or an actuator using hydraulic pressure such as a hydraulic cylinder, may be used. Any of the above actuators can locate and retain coil 22 at at least two positions, i.e., a first position (FIG. 1) where the magnitude of the magnetic gap is a relatively small first value (g1) and a second position (FIG. 2) where the magnitude of the magnetic gap is a second value (g2) larger than the first value. When the hydraulic cylinder is used, the position of coil 22 relative to magnet 26 may be changed and retained between the first and second positions by adjusting the hydraulic pressure in the hydraulic cylinder. On the other hand, when the air cylinder or the solenoid is used, the position of coil 22 relative to magnet 26 may be changed and retained between the first and second positions by using two air cylinders or solenoids having different strokes.

In the present invention, the actuator may not be used as the magnetic gap changing mechanism, and the magnetic gap may be manually changed. In other words, coil 22 may be configured to be moved relative to magnet 26 in the magnetic gap direction, and coil 22 and slide 24 may be provided with a mechanism (a stopper and a bolt, etc.) by which the position of coil 22 can be manually changed and determined. By virtue of this, the magnitude of the magnetic gap can be changed without using the actuator such as air cylinder 36. In addition, the feature, wherein the actuator may be used as the magnetic gap changing mechanism or the operator may manually change the magnitude of the magnetic gap without using the actuator, is also applicable to the following embodiments.

In general, with respect to the traveling direction of the linear motor, the dimension of the magnet constituting the linear motor is longer than the coil (i.e., the dimension of the magnet corresponds to a summation of the coil length and the stroke length). Therefore, when the magnitude of the magnetic gap should be changed, it is preferable that only the coil be moved as in the first embodiment. In addition, controllability of the linear motor is deteriorated even when the coil is slightly moved during driving the linear motor, while the magnetic attractive force may become hundreds of N (Newtons) even in a small size linear motor. Therefore, it is desired that the coil be positioned and retained.

Figure 3:
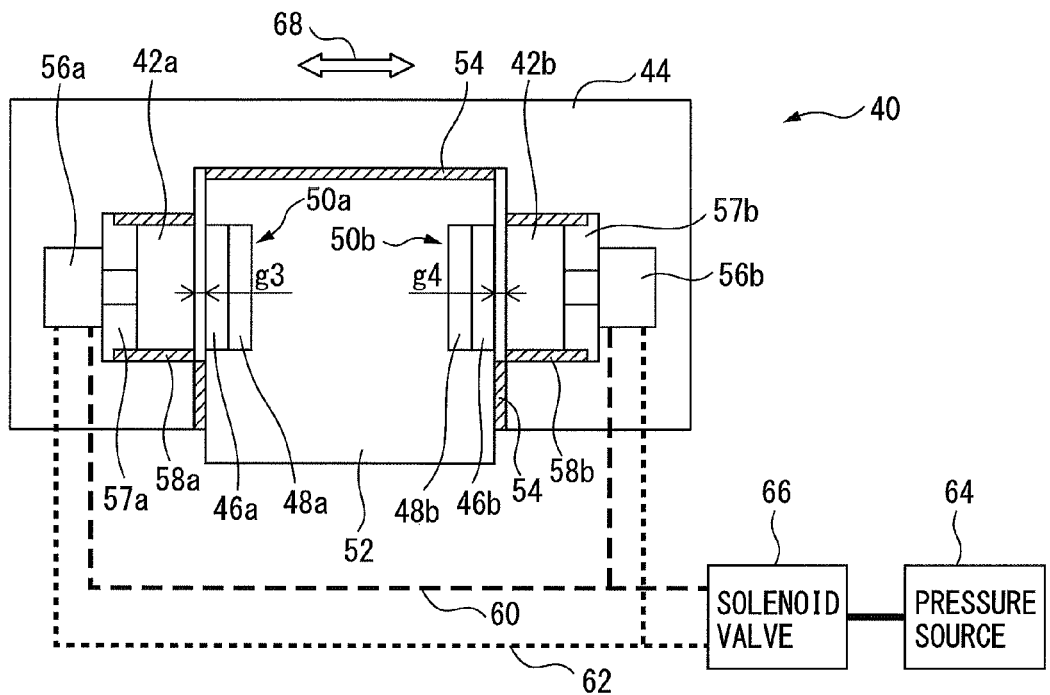
FIG. 3 is a view of a schematic configuration of a linear drive unit having a linear motor according to a second embodiment of the present invention, viewed in a traveling direction of the linear motor.

FIG. 3 is a view of a schematic configuration of a linear drive unit 40 having a linear motor according to a second embodiment of the present invention, viewed in a traveling direction of the linear motor. Linear drive unit 40 has a slide (or a movable part) 44 to which at least one (in the illustrated embodiment, one) pair of coils 42a and 42b, formed by winding a three-phase (U-, V- and W-phase) winding wire on each coil core, are fixed; and a base (or a fixed part) 52 to which at least one (in the illustrated embodiment, one) pair of stators 50a and 50b, formed by arranging magnet 46a and 46b on magnet cores 48a and 48b, respectively, are fixed. Coils 42a and 42b and stators 50a and 50b constitute a major part of the linear motor. Slide 44 is supported by base 52 via a slide bearing 54, so that slide 44 is movable only in the direction of thrust force of the linear motor. As slide bearing 54, a ball bearing, a hydrostatic oil bearing or a hydrostatic air bearing may be used. In this regard, the hydrostatic air bearing is most preferable, as described below.

In the second embodiment, a pair of coils 42a and 42b are positioned opposed to each other in the magnetic gap direction (in the illustrated embodiment, in the horizontal direction) or the direction perpendicular to the traveling direction of the linear motor. A pair of magnets 46a and 46b are positioned so as to form magnetic gap g3 between magnet 46a and coil 42a, and magnetic gap g4 between magnet 46b and coil 42b.

The configuration of each coil (or the moving element) and each stator may be the same as the conventional coil and stator, respectively, and thus a detailed explanation thereof will be omitted. Actually, in order to drive the linear motor, a servo amplifier, an NC device and a linear scale are used, which are not illustrated.

As shown in FIG. 3, linear drive unit 40 has a magnetic gap changing mechanism (in the illustrated embodiment, an air cylinder) 56a configured to change the magnitude of air gap g3 between coil 42a and magnet 46a by moving at least one of coil 42a and magnet 46a (in the illustrated embodiment, coil 42a) so that coil 42a and magnet 46a approach or are separated from each other. Similarly, linear drive unit 40 has a magnetic gap changing mechanism (in the illustrated embodiment, an air cylinder) 56b configured to change the magnitude of air gap g4 between coil 42b and magnet 46b by moving at least one of coil 42b and magnet 46b (in the illustrated embodiment, coil 42b) so that coil 42b and magnet 46b approach or are separated from each other.

Air cylinder 56a has one (upper) end fixed to slide 44 (in the illustrated embodiment, an inner side surface of a concave portion 57a formed in slide 44), and the other (lower) end fixed to coil 42a. Due to a drive force of air cylinder 56a, the position of coil 42a relative to slide 44 can be varied in the gap direction (in the illustrated embodiment, in the horizontal direction). Similarly, air cylinder 56b has one (upper) end fixed to slide 44 (in the illustrated embodiment, an inner side surface of a concave portion 57b formed in slide 44), and the other (lower) end fixed to coil 42b. Due to a drive force of air cylinder 56b, the position of coil 42b relative to slide 44 can be varied in the gap direction (in the illustrated embodiment, in the horizontal direction).

Between (the inner surface of concave portion 57a of) slide 44 and coil 42a, it is preferable that a coil bearing 58a such as a slide bearing be arranged, so that the movement direction of the coil is limited to the gap direction. However, when air cylinder 56a includes a bearing having sufficient stiffness, air cylinder 56a only may support coil 42a without using coil bearing 58a. Otherwise, coil 42a may be supported by a plurality of air cylinders. Similarly, between (the inner surface of concave portion 57b of) slide 44 and coil 42b, it is preferable that a coil bearing 58b such as a slide bearing be arranged, so that the movement direction of the coil is limited to the gap direction. However, when air cylinder 56b includes a bearing having sufficient stiffness, air cylinder 56b only may support coil 42b without using coil bearing 58b. Otherwise, coil 42b may be supported by a plurality of air cylinders.

Normally, since magnetic attractive force of magnets 46a and 46b applied to coils 42a and 42b, respectively, may approach hundreds of N (Newtons), it is preferable that air cylinders 56a and 56b be configured to generate the drive force greater than the magnetic attractive force, in order to change and maintain the magnitude of the magnetic gaps. Further, since controllability of the linear motor is deteriorated even when coils 42a and 42b are slightly moved during driving the linear motor, it is preferable that air cylinders 56a and 56b and coil bearings 58a and 58b have sufficient stiffness so as to maintain the position of coils 42a and 42b, respectively.

As shown in FIG. 3, it is preferable that a pair of coils 42a and 42b be symmetrically positioned inside slide 44, with respect to a surface perpendicular to the traveling direction of the linear motor, and that stators 50a and 50b (magnets 46a and 46b) be positioned on a surface of base 52 opposed to the respective coils. By virtue of such a configuration, the magnetic attractive forces of the magnets applied to coils 42a and 42b are canceled each other in principle, whereby the deterioration in the straightness of slide 44 due to the cogging can be significantly limited. Actually, due to unevenness of magnetization, a dimensional error and/or a positioning error of the magnet, the magnetic attractive force cannot be completely symmetrical. Therefore, although the cogging cannot be zero even when the coils are symmetrical, the influence of the cogging may be reduced to an extent having no practical problem, by symmetrically constituting the coils. In particular, when the stiffness of slide bearing 54 is low, the influence of the cogging may be remarkably reversed.

To each of air cylinders 56a and 56b, two kinds of pipe lines are connected. Each air cylinder is configured to be displaced in the direction in which each air cylinder is contracted (or the air gap is enlarged) when the pressure is applied to a first pipe line 60, and is configured to be displaced in the direction in which each air cylinder is extended (or the air gap is narrowed) when the pressure is applied to a second pipe line 62. A solenoid vale 66 (or controlled equipment), which is connected to pipe lines 60, 62 and a pressure source 64 such as an air compressor, may be used so as to selectively switch as to which pipe line the pressure is applied to. By virtue of such a configuration, the same magnitude of air pressure can be simultaneously applied to the two air cylinders, whereby magnetic gaps g3 and g4 can be simultaneously changed by the same distance.

The advantage of simultaneously changing the magnitudes of the magnetic gaps as described above is that unbalanced force is not applied to slide 44. As described above, since the magnetic attractive force of the magnet may approach hundreds of N (Newtons), large unbalanced force may be applied to the slide when the magnitudes of the magnetic gaps are changed one-by-one. In particular, when the hydrostatic air bearing is used as slide bearing 54, a shaft of the bearing and a bearing surface of the bearing may contact each other and may be damaged. By simultaneously changing the magnitudes of the magnetic gaps, such unbalanced force may be minimized. In addition, an arrow 68 in FIG. 3 indicates a direction of an error of the straightness of slide 44 due to the cogging.

The present invention is particularly advantageous when slide bearing 34 or 54 is the hydrostatic air bearing. In general, an air bearing supports an object in a contactless manner by flowing high-pressure air within a gap having a width of several micrometers, and is adapted for driving with high accuracy since a friction in the air bearing is almost zero. Further, since an amount of heat generation in the air bearing is almost zero even when high-speed driving, the air bearing is usually used in an ultra-precision processing machine, etc. However, a stiffness value of the hydrostatic air bearing is an order of magnitude smaller than a ball bearing or a hydrostatic oil bearing, and thus the hydrostatic air bearing is easily influenced by the cogging. Therefore, in the prior art, the hydrostatic air bearing is combined with a linear motor having a relatively large magnetic gap, and is used while the straightness having high accuracy is maintained. In this regard, since the thrust force is decreased as the magnetic gap is enlarged, the hydrostatic air bearing is unsuitable for the driving with high load. Even if high current is applied to the linear motor in order to obtain high thrust force, the linear motor becomes inefficient due to a large amount of heat generation.

In an ultra-precision processing machine, etc., wherein precise positioning and driving are required, it is necessary to drive the linear motor with nanometer accuracy, whereas thermal expansion due to heat generation easily results in an error of micrometer order. Therefore, it is very important to reduce the heat generation. Once the heat is generated, the machine tool having a large heat capacity takes time to return the original accuracy (or the machine temperature). Even when the machine tool includes a cooling mechanism, it is difficult to locate a heat source and an object to be cooled at the same position, and thus a temperature distribution is inevitably generated in the machine tool. Further, although a low thermal expansion material may be used, such a material is expensive, and thus it is distant to constitute the entire machine tool by using such a material. Accordingly, in order to obtain a certain degree of accuracy, a drive mechanism for generating heat as few as possible is necessary.

Thus, the present invention provides the linear drive unit using the linear motor wherein the magnitude of the magnetic gap is variable. In other words, the linear drive unit has a plurality of operation modes wherein the magnitude of the magnetic gap is decreased so as to limit the heat generation when driving the linear motor with high load, and the magnitude of the magnetic gap is increased so as to carry out precise driving when driving the linear motor with low load. According to the invention, in high-load operation such as a crude-processing mode, the magnitude of the magnetic gap may be decreased so as to limit an amount of heat generation (i.e., give priority to high-speed and high-efficiency). On the other hand, in low-load operation such as a finish-processing mode, the magnitude of the magnetic gap may be increased so as to give priority to accuracy, whereby the demerit of the hydrostatic air bearing can be compensated and the merit of the hydrostatic air bearing can be maximized.

Figure 4:
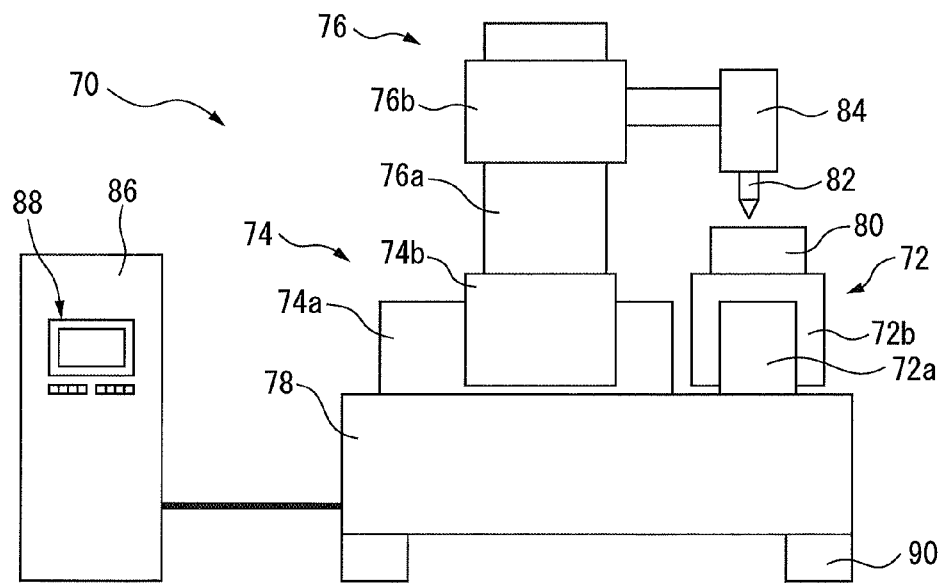
FIG. 4 is a view showing a structural example wherein the linear drive unit of the invention is applied to an ultra-precision processing machine.
Figure 5:
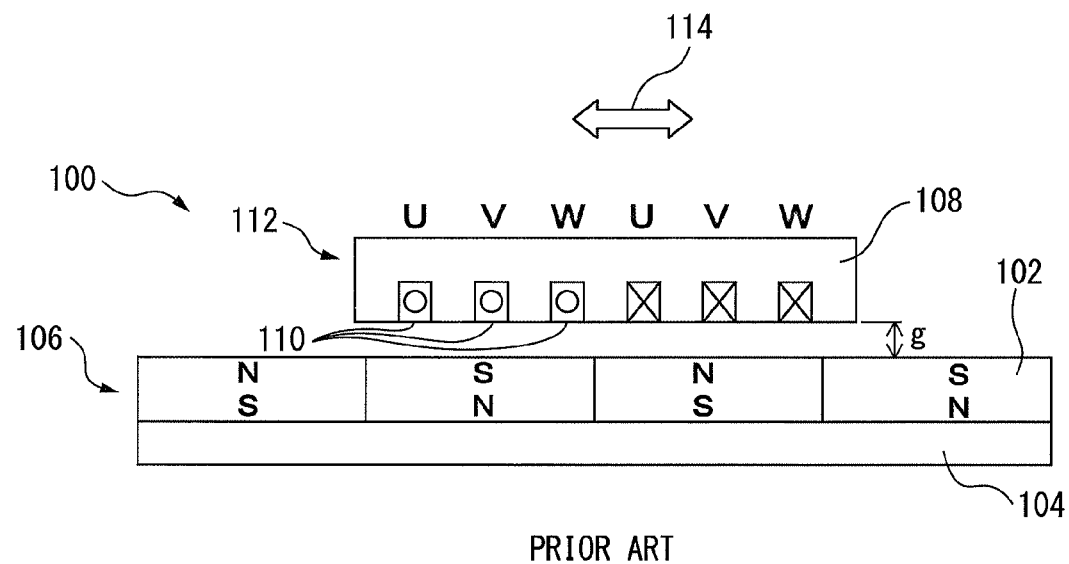
FIG. 5 is a view schematically showing a structure of a linear motor of the prior art.
Figure 6:
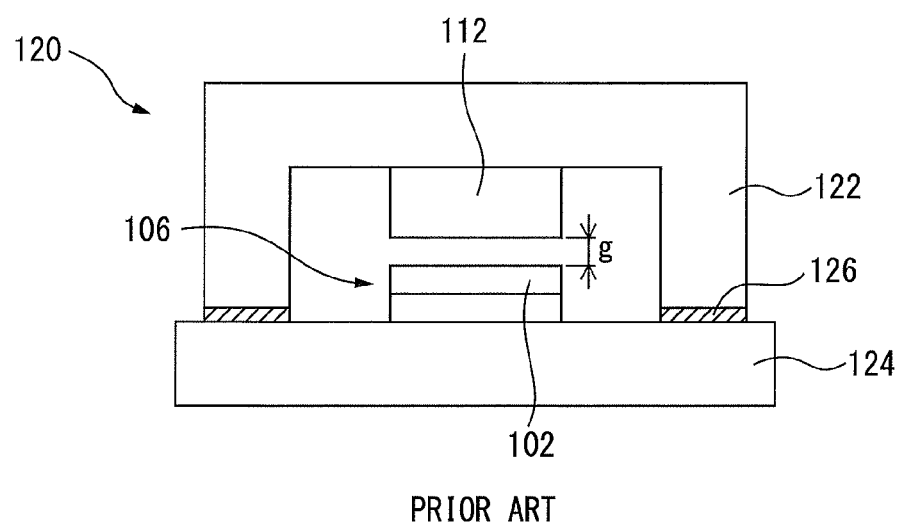
FIG. 6 is a view of a schematic configuration of a linear drive unit having a linear motor of the prior art, viewed in a traveling direction of the linear motor.

FIG. 4 shows a structural example of an ultra-precision processing machine 70, as a machine tool including a linear drive unit according to the present invention. Ultra-precision processing machine 70 includes three linear axes (X-axis 72, Y-axis 74 and Z-axis 76) intersecting at right angles to each other, and at least one of the three linear axes has the linear motor as shown in FIG. 1 or 3, wherein the magnitude of the magnetic gap is variable.

In the example of FIG. 4, an X-axis base 72a constituting X-axis 72, and an X-axis slide 72b slidable on X-axis base 72a in a direction perpendicular to the drawing are arranged on a machine base 78. A workpiece 80 to be processed is located on X-axis slide 72b. Further, a Y-axis base 74a constituting Y-axis 74, and a Y-axis slide 74b slidable on Y-axis base 72b are arranged on machine base 78, wherein the sliding directions of X-axis slide 72b and Y-axis slide 74b are intersect at a right angle to each other on a generally horizontal plane.

In addition, a Z-axis base 76a constituting Z-axis 76 is arranged on Y-axis slide 74b so that Z-axis base 76a extends in a direction (in the illustrated embodiment, in the vertical direction) perpendicular to both X-axis 72 and Y-axis 74. A Z-axis slide 76b is slidably arranged on Z-axis base 76a in the generally vertical direction. A spindle 84 having a tool 82 for processing workpiece 80 is attached to Z-axis slide 76b.

Machine tool 70 has a controller 86 including an NC device capable of simultaneously controlling each linear axis. An operator can operates the machine tool by using a display-operation panel 88 arranged on controller 86 so that a predetermined processing is carried out in relation to workpiece 80. Controller 86 has a first operation mode (for example, a crude processing mode) with magnetic gap g1 wherein the coil and the magnet are close to each other, and a second operation mode (for example, a finish processing mode) which is carried out with magnetic gap g2 larger than magnetic gap g1 in the first operation mode. When the operator selects either of the operation modes, the magnetic gap is automatically set corresponding to the selected mode. When the plurality of linear axes have the magnetic gap changing mechanism (for example, the actuator), the operation mode may be selected in relation to each linear axis. For example, the machine tool may be operated wherein the X-axis is operated in the crude processing mode, and the Y- and Z-axes are operated in the finish processing mode.

Machine base 78 may be positioned on an air dumper 90 located on a floor, whereby an influence due to vibration of the floor may be eliminated. In general, when the machine on the air dumper is in high-speed motion, the air dumper is bumped with its rebound. Therefore, in the crude processing mode in which the accuracy is not important, air supplied to air dumper 90 may be cut so as to limit jounce of machine tool 70.

In the prior art, an ultra-precision processing machine, wherein an air bearing and the conventional linear motor are combined, is not suitable to be driven with high load, and thus such an ultra-precision processing machine can be applied to the finishing processing only. On the other hand, in the ultra-precision processing machine as shown in FIG. 4, the processing may be carried out while giving priority to high-speed and high-efficiency in the crude processing mode with high load, and then, the processing may be carried out while giving priority to accuracy in the finish processing mode with the same degree of accuracy as the conventional ultra-precision processing machine. As such, by selecting one of the modes depending on the type of processing, the processing time and cost can be significantly reduced.

On the other hand, in an ultra-precision processing machine, wherein a ball bearing or a hydrostatic oil bearing and the conventional linear motor are combined, driving resistance of the bearing may cause heat generation. Therefore, the influence of heat generation cannot be ignored in high-speed processing. Then, by combining the linear motor of the invention with a low-heat-generating bearing such as a hydrostatic air bearing having, both the crude processing and the finish processing can be carried out with minimum heat generation, which is very remarkable merit. In addition, regarding the demerit wherein the stiffness of the air bearing is low, the effect on the processing accuracy can be minimized by selectively switching the processing mode.

As described above, in the machine tool, necessary velocity and accuracy are different depending on the type of processing. Therefore, by changing the magnitude of the magnetic gap in the crude processing and the finish processing, the high-speed and high-efficiency process and the high-accuracy process may be properly selected and used. In addition, not only the crude processing mode and the finish processing mode, but also another mode may be prepared, wherein the magnitude of the magnetic gap is set to an intermediate value between the crude processing mode and the finish processing mode, or, wherein the magnitude of a particular axis is changed (for example, a mode wherein only one axis is driven with high velocity).

According to the present invention, the magnitude of the magnetic gap between the coil and the magnet of the linear motor can be purposely changed, whereby the versatile linear drive unit may be provided, wherein the cogging and the thrust force of the linear motor are balanced.

By using the actuator as the magnetic gap changing mechanism, the magnetic gap can be automatically and easily changed.

In general, with respect to the traveling direction of the linear motor, the dimension of the magnet is longer than the coil (i.e., the dimension of the magnet corresponds to a summation of the coil length and the stroke length). Therefore, the magnitude of the magnetic gap can be easily changed by moving the coil only.

By arranging a pair of linear motors opposed to each other in the direction of the magnetic gap, and by equalizing the magnitudes of the magnetic gaps of the pair of linear motors, the magnetic attractive forces in the magnetic gap direction are canceled each other, whereby the dogging can be significantly reduced.

By simultaneously changing the magnitudes of the magnetic gaps of the pair of linear motors by the same amount of displacement, large unbalanced force, which is generated when the magnitudes of the magnetic gaps are changed one-by-one, can be minimized.

By using the hydrostatic air bearing as the slide bearing, the characteristic of the hydrostatic air bearing (i.e., the hydrostatic air bearing is easily influenced by the cogging due to the low stiffness, but the amount of heat generation is low) can be maximized.

By virtue of the machine tool including the linear drive unit of the invention and a plurality of operation modes wherein the magnitude of the magnetic gap is different, the efficiency-oriented high-speed processing and the precision-oriented high-accuracy processing can be properly selected and used.

While the invention has been described with reference to specific embodiments chosen for the purpose of illustration, it should be apparent that numerous modifications could be made thereto, by one skilled in the art, without departing from the basic concept and scope of the invention.

The invention claimed is:

1. A machine tool comprising a linear drive unit having a linear motor provided with a magnet and a coil having a coil core, wherein a movable part is configured to linearly move relative to a fixed part via a bearing,
   wherein the linear drive unit comprises a magnetic gap changing mechanism which is configured to change a magnitude of a magnetic gap between the coil and the magnet, by displacing the coil so that the coil and the magnet approach or are separated from each other,
   wherein the coil is positioned within a coil bearing, and the coil bearing guides a movement direction of the coil in a direction of the magnetic gap,
   and wherein the machine tool has a plurality of processing modes in which the magnitudes of the magnetic gaps are different from each other, and the processing modes includes a crude processing mode and a finish processing mode, in which the magnetic gap in the finish processing mode is larger than the magnetic gap in the crude processing mode.

2. The machine tool as set forth in claim 1, wherein the magnetic gap changing mechanism is an actuator which is driven electrically, pneumatically or hydraulically.

3. The machine tool as set forth in claim 1, wherein the magnetic gap changing mechanism is configured to position and hold the coil relative to the magnet between a first position where the magnetic gap is a first value and a second position where the magnetic gap is a second value larger than the first value.

4. The machine tool as set forth in claim 1, wherein a pair of linear motors are arranged opposed to each other in the direction of the magnetic gap, and magnitudes of magnetic gaps of the pair of linear motors are equal to each other.

5. The machine tool as set forth in claim 4, wherein the magnetic gap changing mechanism is an actuator which is driven electrically, pneumatically or hydraulically,
   and wherein the coils, the magnets and the actuators in the pair of linear motors have symmetric structures, respectively, and the actuators are configured to simultaneously change the magnitudes of the magnetic gaps by the same amount of displacement.

6. The machine tool as set forth in claim 1, wherein the bearing is a hydrostatic air bearing.

* * * * *